United States Patent
Rinaldi et al.

(10) Patent No.: US 12,081,046 B2
(45) Date of Patent: Sep. 3, 2024

(54) APPARATUS FOR DYNAMIC CONTROL OF WIRELESS POWER TRANSFER

(71) Applicant: Datalogic IP Tech, S.r.l.

(72) Inventors: Alessandro Rinaldi, Bologna (IT); Domenico Gianluca Balzano, Modena (IT); Michele Marino, Rome (IT); Roberto Moschini, Bologna (IT); Marco Pifferi, Bologna (IT); Francesco Pugliese, Bologna (IT)

(73) Assignee: DATALOGIC IP TECH, S.R.L., Bologna (IT)

( * ) Notice: Subject to any disclaimer, the term of this patent is extended or adjusted under 35 U.S.C. 154(b) by 0 days.

(21) Appl. No.: 17/152,595

(22) Filed: Jan. 19, 2021

(65) Prior Publication Data
US 2022/0231546 A1    Jul. 21, 2022

(51) Int. Cl.
| | | |
|---|---|---|
| *H02J 50/90* | (2016.01) | |
| *H02J 50/10* | (2016.01) | |
| *H02J 50/40* | (2016.01) | |
| *H02J 50/80* | (2016.01) | |
| *H04B 5/79* | (2024.01) | |

(52) U.S. Cl.
CPC .............. *H02J 50/90* (2016.02); *H02J 50/10* (2016.02); *H02J 50/40* (2016.02); *H02J 50/80* (2016.02); *H04B 5/79* (2024.01)

(58) Field of Classification Search
CPC .................................. H02J 50/00; H04B 5/00
See application file for complete search history.

(56) References Cited

U.S. PATENT DOCUMENTS

| | | | |
|---|---|---|---|
| 9,742,214 B2 | 8/2017 | Ha et al. | |
| 10,199,868 B2 | 2/2019 | Nakano et al. | |
| 10,454,313 B2 * | 10/2019 | Hwang | H02J 50/12 |
| 2007/0178857 A1 * | 8/2007 | Greene | H02J 50/001 |
| | | | 455/127.1 |
| 2010/0207575 A1 * | 8/2010 | Pijnenburg | H02J 50/80 |
| | | | 320/108 |
| 2011/0069516 A1 * | 3/2011 | Greene | H02M 7/08 |
| | | | 363/126 |
| 2012/0133216 A1 * | 5/2012 | Amma | H02J 50/20 |
| | | | 307/104 |

(Continued)

FOREIGN PATENT DOCUMENTS

| | | | |
|---|---|---|---|
| CN | 105978170 A | 9/2016 | |
| WO | WO-2016153208 A1 * | 9/2016 | H02J 50/00 |

OTHER PUBLICATIONS

Hwang et al., "An All-in-One (Qi, PMA and A4WP) 2.5W Fully Integrated Wireless Battery Charger IC for Wearable Applications", 2016 IEEE International Solid-State Circuits Conference, p. 378-380, (Year: 2016).*

(Continued)

*Primary Examiner* — Adi Amrany
(74) *Attorney, Agent, or Firm* — Cozen O'Connor

(57) ABSTRACT

A wireless power transfer (WPT) system is operative to dynamically make power-transfer efficiency optimizations based on supply power, load characteristics, or a combination thereof. In various embodiments, optimizations include power-level-specific path selection, loading-based WPT voltage adjustments, and other techniques in various combinations.

19 Claims, 9 Drawing Sheets

(56) References Cited

U.S. PATENT DOCUMENTS

| | | | | |
|---|---|---|---|---|
| 2012/0149301 | A1* | 6/2012 | Wiley | H02J 50/12 |
| | | | | 455/67.11 |
| 2012/0293006 | A1* | 11/2012 | Kim | H04B 5/0031 |
| | | | | 307/104 |
| 2015/0115879 | A1* | 4/2015 | Park | H02J 50/10 |
| | | | | 320/108 |
| 2015/0155918 | A1* | 6/2015 | Van Wageningen | |
| | | | | H04B 5/0031 |
| | | | | 307/104 |
| 2016/0094050 | A1* | 3/2016 | Shichino | H02J 50/40 |
| | | | | 307/104 |
| 2017/0025901 | A1 | 1/2017 | DeLa Cruz | |
| 2017/0093172 | A1* | 3/2017 | Von Novak, III | H02J 50/402 |
| 2017/0126064 | A1* | 5/2017 | Lee | H02J 50/70 |
| 2017/0141585 | A1* | 5/2017 | Walley | H02M 7/1626 |
| 2017/0279305 | A1* | 9/2017 | Staring | H02J 50/10 |
| 2018/0048185 | A1* | 2/2018 | Hwang | H02J 50/12 |
| 2018/0062419 | A1* | 3/2018 | Park | H02J 50/12 |
| 2018/0076672 | A1* | 3/2018 | Shichino | H04B 5/0037 |
| 2018/0083487 | A1* | 3/2018 | Nalbant | H02J 7/00308 |
| 2019/0260240 | A1 | 8/2019 | Kwon et al. | |
| 2019/0305826 | A1* | 10/2019 | Park | H02J 7/02 |
| 2020/0044482 | A1 | 2/2020 | Partovi et al. | |
| 2020/0106279 | A1 | 4/2020 | Di Bari et al. | |
| 2020/0127501 | A1 | 4/2020 | Song | |
| 2020/0177028 | A1 | 6/2020 | Esteban et al. | |
| 2020/0303969 | A1* | 9/2020 | Manzi | H02J 50/80 |
| 2020/0313642 | A1* | 10/2020 | Mimino | H02J 50/12 |
| 2020/0343777 | A1* | 10/2020 | Jia | H02J 7/025 |
| 2021/0175748 | A1* | 6/2021 | Moffatt | H02M 3/33576 |

OTHER PUBLICATIONS

CHOETECH Caricatore Wireless Doppio, 5 Bobine con QC 3.0 Adattatore Ricarica Wireless 10W per Galaxy S20/S10/S9/S9 +/S8/S8 +/Note 8, 7.5W Fast Wireless Charger per iPhone SE/11/11 Pro/XSXR/X/8/8 Plus, https://www.amazon.it/CHOETECH-Caricatore-Wireless-Adattatore-Ricarica/dp/B07W5MSKP2/ref=psdc_5431738031_t2_B078MKF7Y8?th=1.

https://www.amazon.com/Nomad-Wireless-Charging-Base-Station/dp/B07HY8XC8G.

SBS 10W wireless power bank, http://www.sbsmobile.com/en-GB/products/power-cables/powerbank/5234-10w-wireless-power-bank.html.

Qi Wireless Power Consortium, Introduction to the Power Class 0 Specification, Version 1.2.3., pdf, 16 pages, Feb. 2017.

European Search Report of European Application No. 21217951.9-1202, dated Jun. 10, 2022.

* cited by examiner

APPARATUS FOR DYNAMIC CONTROL OF WIRELESS POWER TRANSFER

TECHNICAL FIELD

Embodiments described herein generally relate to powering of electronic devices and, more particularly, to wireless power transfer.

BACKGROUND

Wireless power transfer (WPT) is a practical and convenient solution for powering and recharging the batteries of portable electronic devices. WPT uses a non-contact technique to deliver energy from a base station to a power-recipient device. Most typically, WPT applications utilize inductive coupling arrangements in which coil antennas at the base station and power-recipient device are placed into close proximity to form a transformer through which power may be transferred. The electronics industry has developed WPT standards, such as Qi by the Wireless Power Consortium, and Rezence, promoted by The Alliance for Wireless Power and the Power Matters Alliance. A variety of proprietary WPT technologies also exist.

Advantageously, the transmitter coil in the base station and the receiver coil in the power-recipient device may be separated from one another by the respective housings of the base station and device. Thus, a user of a device employing a WPT system can avoid having to plug and un-plug the device from the power source using an electrical connector, and likewise need not worry about the degradation of exposed electrical contacts due to mechanical wear or corrosion. WPT systems are particularly advantageous in wet or dusty environments, and in environments where the device is frequently coupled and decoupled from a power source.

A common application for WPT systems is in charging cradles or pads for handheld devices that are powered by rechargeable batteries. Recent advances in battery technology have increased the energy density of the battery cells, and have developed electrode and electrolyte materials and geometries that enable rapid charging of battery cells using high currents. Whereas traditional battery-chargers have utilized relatively low power, such as 5 V and 500 mA for charging cycles that lasted many hours, it is not unusual to see modern chargers using higher voltages and currents, such as 12 V and 1.5 A. For instance, the Qi standard includes a baseline power profile (BPP) up to 5 W, and extended power profile (EPP) up to 15 W, and a Class 0 EPP up to 30 W. It is expected that energy demands for battery charging and other uses in the future will call for greater power levels. A proprietary power-delivery extension (PPDE) certification program has been introduced by the Wireless Power Consortium to facilitate the use of higher power levels, subject to additional safety testing.

In many applications, there remains a need for charging systems to be backwards compatible with traditional low-power supplies, such as universal serial bus (USB) versions 1.0 or 2.0, which are commonly found in personal computers, portable chargers, ubiquitous power adapters, and the like. Conventionally, the amount of power that can be transferred between the base station and the power-recipient device is arranged during a negotiation protocol that occurs during communication phases occurring before power transfer is initiated. The power-recipient device requests a certain amount of power, and the base station delivers the requested amount. This communication assures interoperability between lower-power and higher-power base stations/devices.

Typically, the WPT systems of power-receiving devices and corresponding base stations have WPT system properties that are optimized for an expected power level. For instance, the WPT system may have a particular coil antenna geometry, WPT frequency, signal-conditioning circuitry, such as power regulation or conversion circuitry, or the like, that works most efficiently at a certain wattage.

Whether a device uses lower-power or higher-power WPT, various challenges must be dealt with. For example, higher-power WPT devices must contend with heating caused by the WPT system. There is a practical temperature range in which batteries may be safely and reliably charged, and the high end of this range tends to be not much warmer than certain high-temperature environments, such as factories, kitchens, warm outdoor locations, and the like. The temperature rise attributed to inefficiencies of the WPT system may prevent charging to be performed at the maximum rate. In lower-power WPT devices, the inefficiencies of the WPT system may limit the available power from the power source for charging the batteries at an acceptable rate, or such inefficiencies may prevent a device from being powered on and used while also receiving power for charging of its battery.

Solutions are needed to address these, and other challenges in WPT systems.

SUMMARY

Aspects of the embodiments are generally directed to wireless power transfer (WPT) efficiency optimizations. In some embodiments, an apparatus for a WPT transmitter includes a power input arranged to receive electrical power from a power source, first transmitter (TX) path circuitry arranged to be coupled to the power input and to a first set of at least one transmission coil, second TX path circuitry arranged to be coupled to the power input and to a second set of at least one transmission coil, transmitter mode selector circuitry arranged to selectively couple one of the first TX path circuitry and the second TX path circuitry between the power input and the first or the second set of at least one transmission coil in response to a path selection signal, and controller circuitry communicatively coupled to the power input and to the transmitter mode selector circuitry. The controller circuitry is operative to determine a power level of the power source from among a first power level and a second power level, and to generate the path selection signal based on the determined power level of the power source. The first TX path circuitry is operative to provide WPT transmission at a greater efficiency to a WPT receiver when the power source is at the first power level than when the power source is at the second power level. The second TX path circuitry is operative to provide WPT transmission at a greater efficiency to a WPT receiver when the power source is at the second power level than when the power source is at the first power level.

In a related embodiment, a WPT receiver includes a power output arranged to provide WPT-received electrical power to a load, first receiver (RX) path circuitry arranged to be coupled to the power output and to a first set of at least one reception coil, second RX path circuitry arranged to be coupled to the power output and to a second set of at least one reception coil, receiver mode selector circuitry arranged to selectively couple one of the first RX path circuitry and the second RX path circuitry between the power output and the first or the second set of at least one reception coil in response to a path selection signal, and controller circuitry communicatively coupled to the receiver mode selector circuitry, and operative to generate the path selection signal based on a power requirement of the load. One of the first RX path circuitry and the second RX path circuitry is operative to selectively receive WPT transmission from a WPT transmitter based on the path selection signal. The first RX path circuitry is operative to receive the WPT transmission at a greater efficiency when the received WPT is at a first power level than when the received WPT is at a second power level, and the second RX path circuitry is operative to receive the WPT transmission at a greater efficiency when the received WPT is at the second power level than when the received WPT is at the first power level.

In another embodiment, a WPT includes a power output arranged to provide WPT-received electrical power to a load, RX path circuitry coupled to the power output and to a set of at least one reception coil, and to receive WPT via the set of at least one reception coil, and controller circuitry arranged to read measurements of voltage at the load and of current being drawn by the load, and to dynamically adjust a characteristic of the WPT in response to the measurements.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
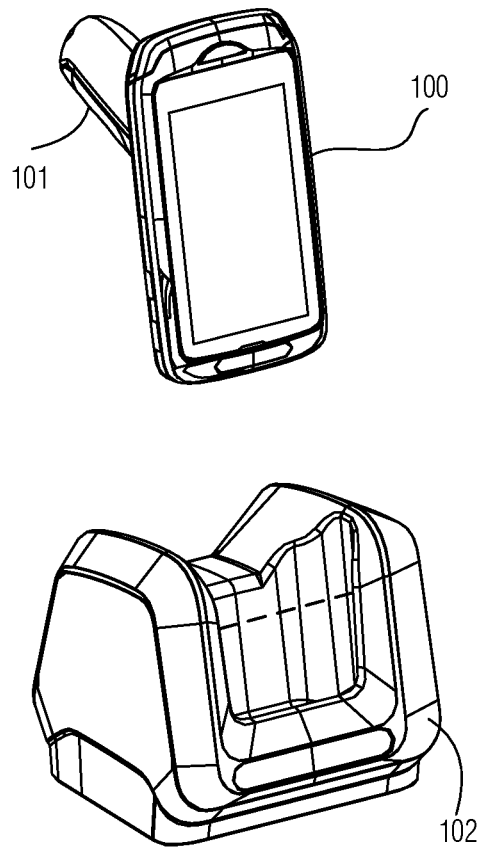
FIG. 1A is a perspective-view diagram illustrating a wireless power transfer (WPT) charging station for a power-receiving device (PRD) that is a gun-style handheld information device (HID) having a grip, according to some embodiments.
Figure 1B:
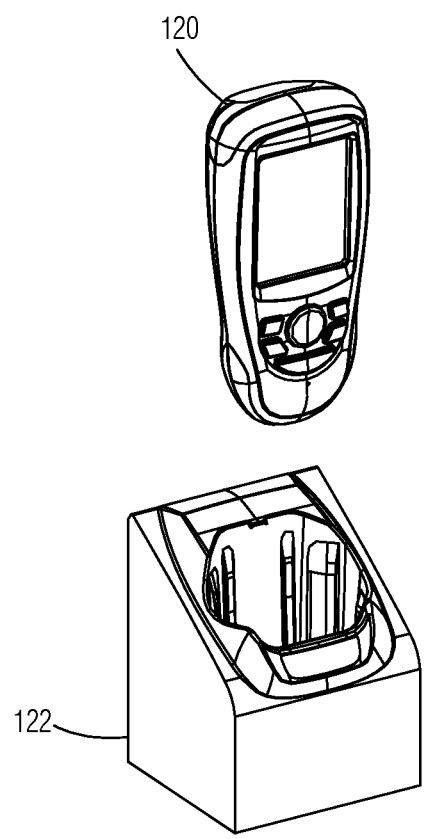
FIG. 1B is a diagram illustrating a WPT charging station that is a cradle-style charging station according to some embodiments.
Figure 1C:
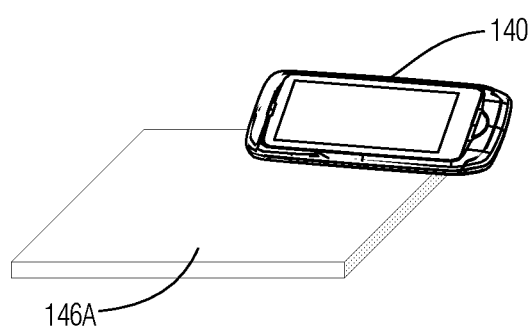
FIG. 1C is a diagram illustrating a pad-style WPT charging station for HIDs according to some embodiments.

FIGS. 1A-1C are perspective-view diagrams illustrating various styles of charging stations for handheld information devices (HIDs). FIG. 1A illustrates a gun-style HID 100 that has grip 101. Station 102 in this example is a charging station having a form that is made to correspond with the exterior shape of HID 100. In particular, station 102 has a body that includes a receiving surface designed conform with grip 101 and portions of the underside of HID 100.

Charging stations and HIDs according to various embodiments may take a variety of other form factors. FIG. 1B is a diagram illustrating a partially-enclosed charging cradle-style HID station 122 for HID 120. HID station 122 has a body that accommodates HID 120, which has a more compact form factor than HID 100. When HID 120 is engaged with charging cradle 122, a portion of HID 120 sits inside the partial enclosure. FIG. 1C is a diagram illustrating a pad-style wireless charging station 142 for use with HID 140. Charging station 142 has a top surface on which HID 140 may be placed, and this surface may include printed graphics or other visual indicia to assist the operator to properly place HID 140, but it otherwise lacks any structural alignment feature to enforce the proper placement.

Figure 2:
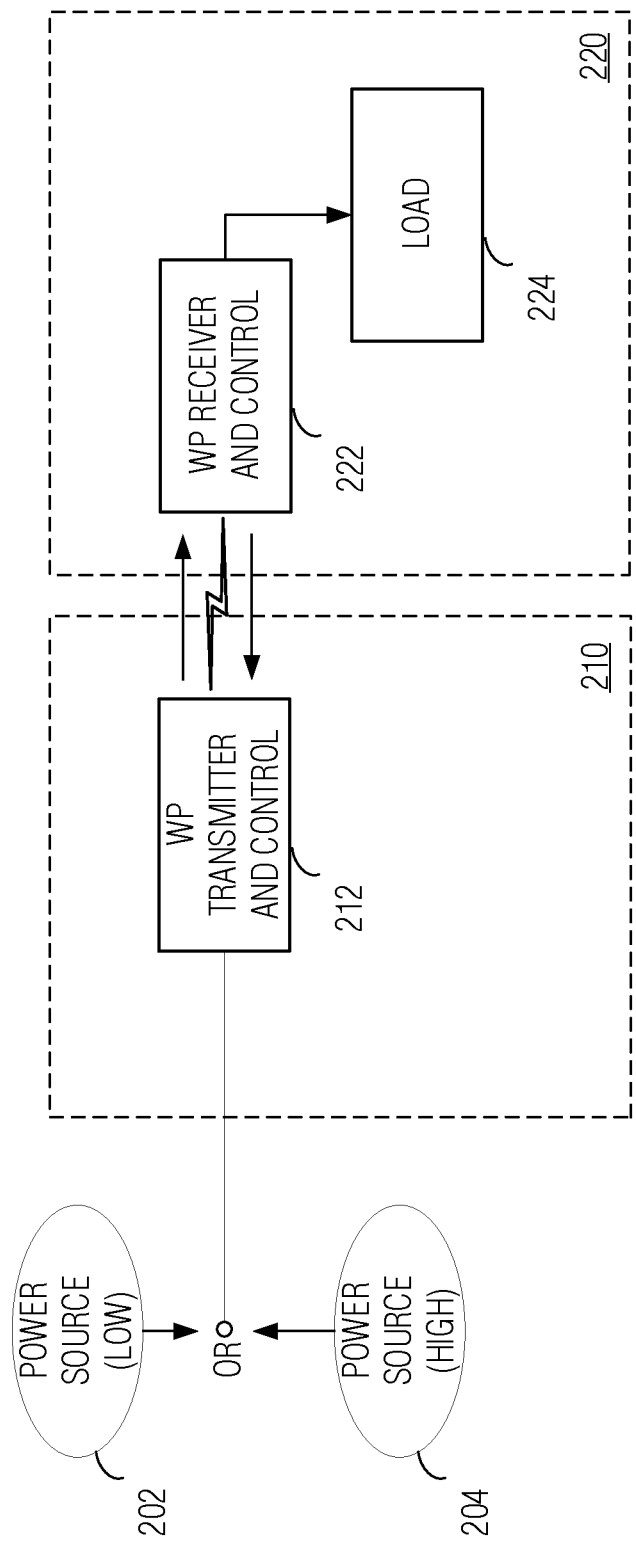
FIG. 2 is a high-level block diagram illustrating a WPT system according to an embodiment.

Each pair of HIDs 100, 120, and 140, and charging stations 102, 122, and 142, respectively, utilize a wireless power transfer (WPT) system according to aspects of this disclosure that can provide power over a wide range of power levels. FIG. 2 is a high-level block diagram illustrating WPT system 200 according to an embodiment. WPT system 200 includes a WP transmitter and control circuit 212, which is in base station 210, and WP receiver and control circuit 222, which is in HID 220. Base station 210 in this example may represent base station 102, 122, or 142 (FIG. 1), and HID 220 may represent HIDs 100, 120, or 140 (FIG. 1).

Base station 210 may be powered from low-power source 202, or from high-power source 204. In the present context, low-power source is a supply that is less than or equal to about 5 W (e.g., ≤5 W+5%). Examples of such a low-power source include universal serial bus (USB) ports according to USB 1.0 or 2.0 specifications for 5 V (≤500 mA), or USB 3.0 specifications for 5 V (≤900 mA). High-power source 204 in the present context is a supply that is greater than about 5 W, such as a USB power delivery (USB-PD) port that can support such higher wattages at 5 V and at various other voltages, such as 9 V, 15 V, and 20V, with available current supplies of up to 5 A. Other power supplies, such as proprietary power supplies at other voltages may likewise be supported.

According to one aspect of this disclosure, the WPT system is automatically and dynamically reconfigurable for efficiency optimization in a WPT mode (e.g., low-power mode or a high-power mode). Efficiency optimization in the present context means effecting a change in the WPT circuitry based on the present power source to improve the power-transfer efficiency along a path from the power supply 202 or 204 to load circuit 224, which path includes WPT from WP transmitter and control circuit 212 to WP receiver and control circuit 222. The improvement in power-transfer efficiency achieved by a certain optimized WPT mode for the present power source, power demands, and other prevailing conditions is in comparison to the WPT operational efficiency that would have been present in the absence of the optimized WPT mode.

Figure 3:
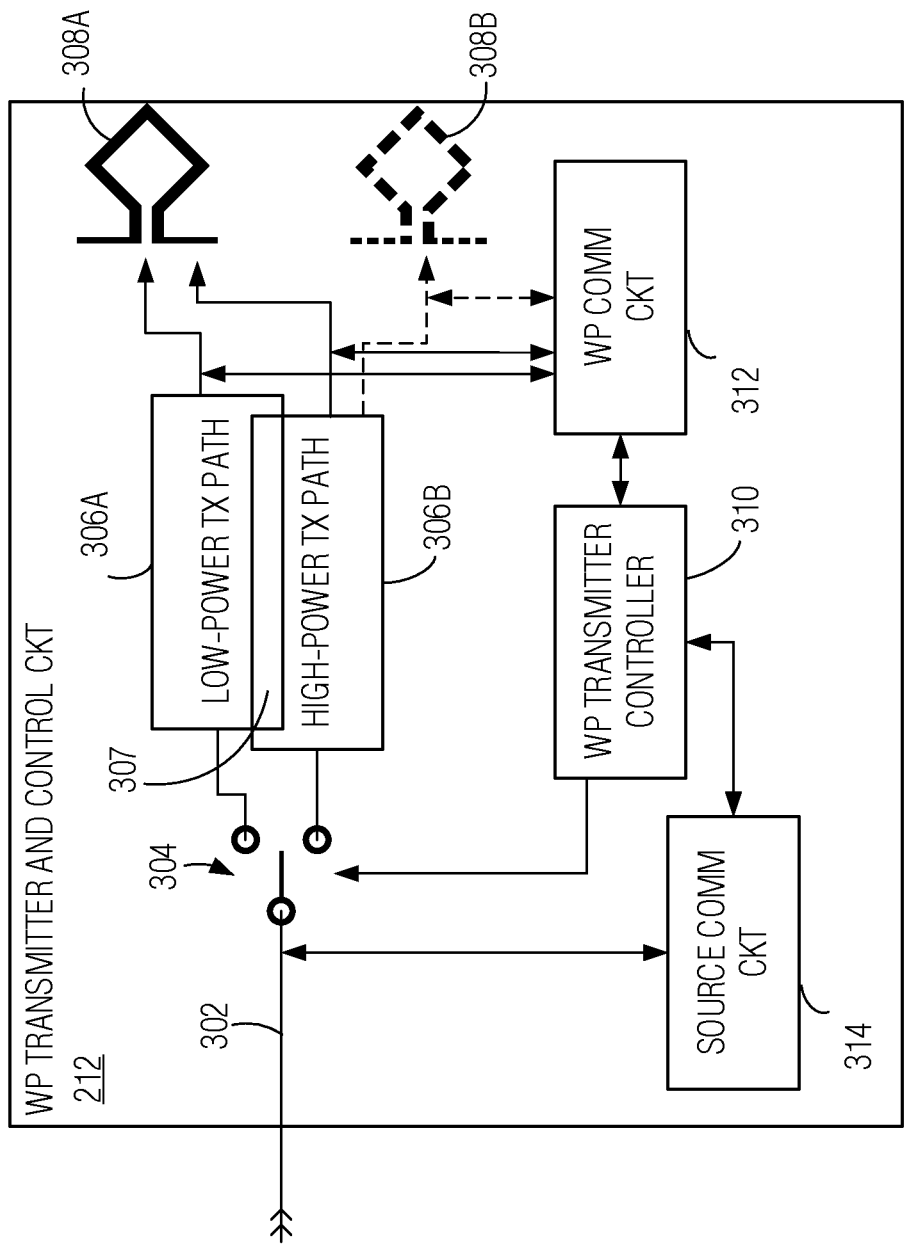
FIG. 3 is a block diagram illustrating a wireless power (WP) transmitter and control circuit of the WPT system of FIG. 2 according to some embodiments.

FIG. 3 is a block diagram illustrating WP transmitter and control circuit 212 in greater detail according to some embodiments. WP transmitter receives supply power via power input 302 from a variety of sources, which may include low-power and high-power supplies. As part of efficiency optimization, WP transmitter and control circuit 212 provides WPT mode selection as represented by mode selector 304, and separate transmitter (TX) paths 306A and 306B, each TX path being optimized for a different power level.

Each TX path 306A, 306B includes circuitry that converts the supply power received via power input 302 to a high-frequency WPT carrier waveform to be wirelessly transmitted to a WPT receiver via coil antenna 308A or 308B. In the present context, the term coil antenna refers to an inductive coil (for magnetic coupling in near-field configurations) or a radiative coil (for electromagnetic coupling in far-field configurations). For instance, each TX path 306A, 306B main include power conditioning circuitry such as a voltage regulator, voltage converter (e.g., buck converter, boost converter, charge pump, etc.), or a combination of these. In addition, each TX path 306A, 306B includes circuitry for generating the WPT carrier waveform, which is coupled to a coil antenna 308A, 308B.

In the example shown, low-power TX path 306A is optimized for operation at low power. For example, low-power TX path 306A may be specifically designed for operation with a 5 VDC input at a defined limited current, such as 1 A. Accordingly, low-power TX path 306A may omit power-conditioning circuitry. In other examples, low-power TX path 306A may include simple and efficient power-conditioning circuitry, such as a single ended primary inductive converter (SEPIC) implemented using relatively small switching transistor with small gate capacitance and fast switching performance.

High-power TX path 306B is optimized for versatility over a range of input voltages. Accordingly, high-power TX path 306B may include a switching regulator (e.g. SEPIC, Cuk, buck-boost), with larger switching transistor size to accommodate higher current. A switching regulator such as this may work to convert a wide range of input voltages to one or more specific voltages to be passed to downstream circuitry for conversion to high-frequency AC signaling and wireless power transmission.

In a related embodiment, low-power TX path 306A and high-power TX path 306B may share certain components, as represented by overlap 307 of the block diagram.

Other optimizations as between TX paths 306A and 306B may include different types of switching transistors and other components needed for generation of the WPT carrier waveform, different carrier frequencies and, optionally, different coil-antenna geometries in embodiments where multiple coil antennas are provided. As illustrated, both TX paths 306A, 306B may use the same coil antenna 308A, or they may use different coil antennas 308A, 308B, respectively.

The WPT mode selection is implemented by WP transmitter controller 310. In some implementations, WP transmitter controller 310 is an embedded microcontroller or other instruction processor and non-volatile memory containing program instructions that, when executed by the instruction processor cause the processor to determine the input supply power and select the appropriate TX path 306A, 306B. In other implementations, WP transmitter controller 310 is implemented as a digital logic circuit (e.g., as an application-specific integrated circuit (ASIC), field-programmable gate array (FPGA), Complex Programmable Logic Device (CPLD), programmable logic array (PLA), programmable array logic (PAL), or the like).

WP transmitter controller 310 may communicate with the power supply via source communication circuitry 314, for example, to negotiate an extended range of supply power via a supported protocol (e.g., USB). Also, WP transmitter controller 310 may communicate with WP receiver and control circuit 222 via WP communication circuit 312. WP communication circuit 312 may support bi-directional communications (half-duplex or full-duplex) over the WPT channel.

Figure 4:
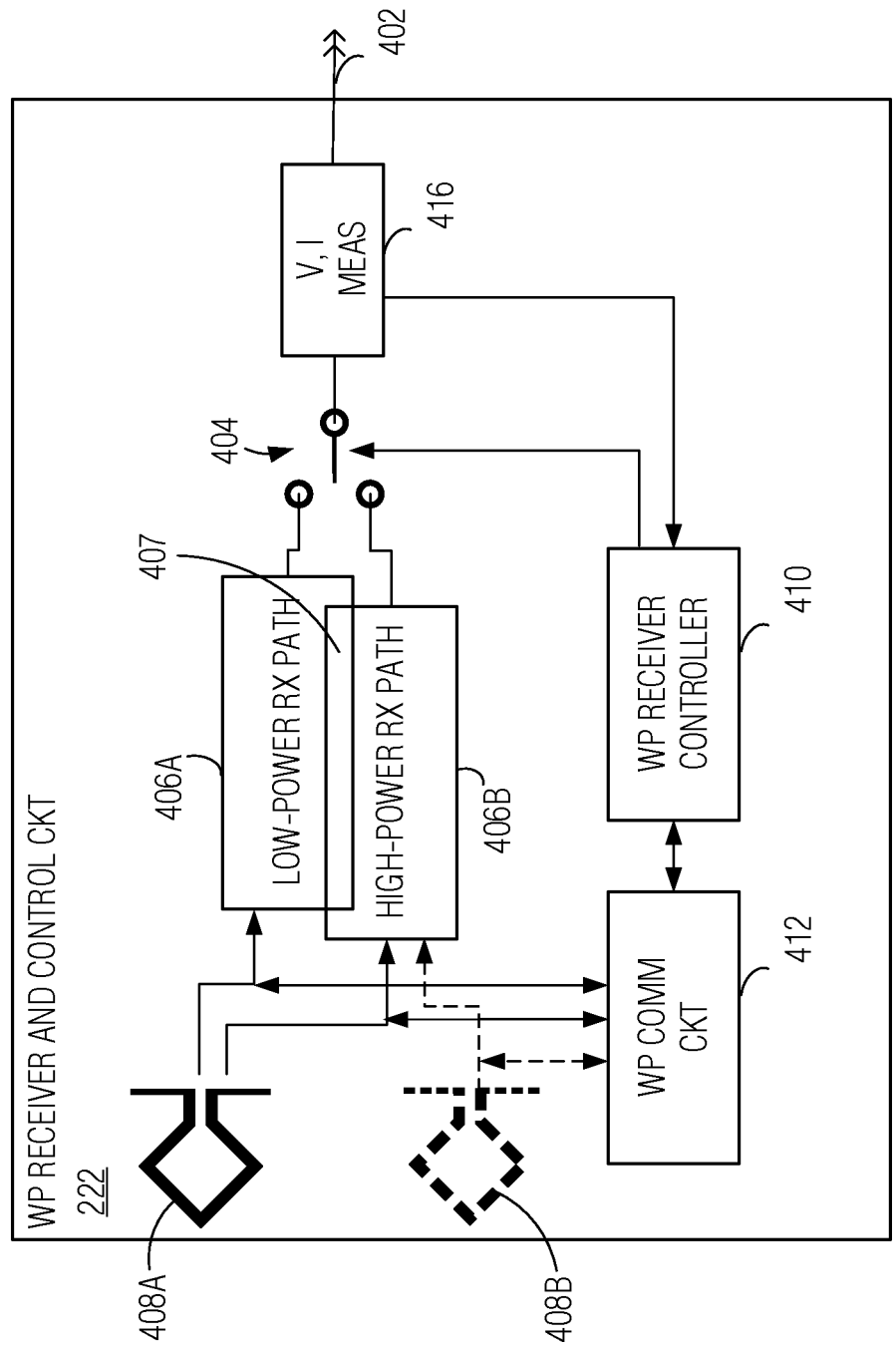
FIG. 4 is a block diagram illustrating a WP receiver and control circuit of the WPT system of FIG. 2 according to some embodiments.

FIG. 4 is a block diagram illustrating WP receiver and control circuit 222 in greater detail according to some embodiments. WP receiver and control circuit 222 includes one or more coil antennas 408A, 408B arranged to be paired with one or more coil antennas 308A, 308B of WP transmitter and control circuit 212 (FIG. 3). In a single-antenna arrangement, coil antenna 408A is coupled to low-power receiver (RX) path 406A and high-power RX path 406B; in a multi-antenna arrangement, coil antenna 408A is coupled to low-power RX path 406A, and coil antenna 408B is coupled to high-power RX path 406B.

Each RX path 406A, 406B includes power-conditioning circuitry that is operative to extract received power via the WPT and convert the received high-frequency waveform into DC power for use by the load. Such circuitry may include a rectifier, filter, and voltage regulator. Each RX path 406A, 406B is optimized for a different power level, in similar principle to optimization of TX paths 306A and 306B (FIG. 3). Accordingly, in one embodiment, the circuitry of low-power RX path 406A may have smaller and more efficient components, optimized for operation at relatively lower received power levels. In a related embodiment, circuitry of high-power RX path 406B may have more robust components that are able to safely withstand higher voltages and currents.

As represented by overlap 407, RX paths 406A and 406B may share some portion of the RX-path circuitry in common.

In one type of embodiment, as described in greater detail below, one or both RX paths 406A, 406B have a reactance circuit to optimize the WP transmission efficiency using the principle of resonance.

Selection of a RX path 406A, 406B is represented in this diagram by mode selector 404, which is controlled by WP receiver controller 410. In some implementations, WP receiver controller 410 is an embedded microcontroller or other instruction processor and non-volatile memory containing program instructions that, when executed by the instruction processor cause the processor to determine the input supply power and select the appropriate RX path 406A, 406B. In other implementations, WP receiver controller 410 is implemented as a digital logic circuit (e.g., as an application-specific integrated circuit (ASIC), field-programmable gate array (FPGA), Complex Programmable Logic Device (CPLD), programmable logic array (PLA), programmable array logic (PAL), or the like).

WP receiver controller 410 may communicate with WP transmitter and control circuit 212 via WP communication circuit 412. WP communication circuit 412 may support bi-directional communications (half-duplex or full-duplex) over the WPT channel. These communications may be used to negotiate power-level settings between WP transmitter and control circuit 212 and WP receiver and control circuit 222, as well as to communicate other relevant WPT messaging.

In some embodiments, WP receiver controller 410 is operative to control the received power based on voltage or current measurements, or both, at the load. Accordingly, in some embodiments, as shown, electrical measurement circuitry 416 at the output of the WP receiver circuitry 402 provides voltage, current, or voltage and current measurements to WP receiver controller 410.

Figure 5:
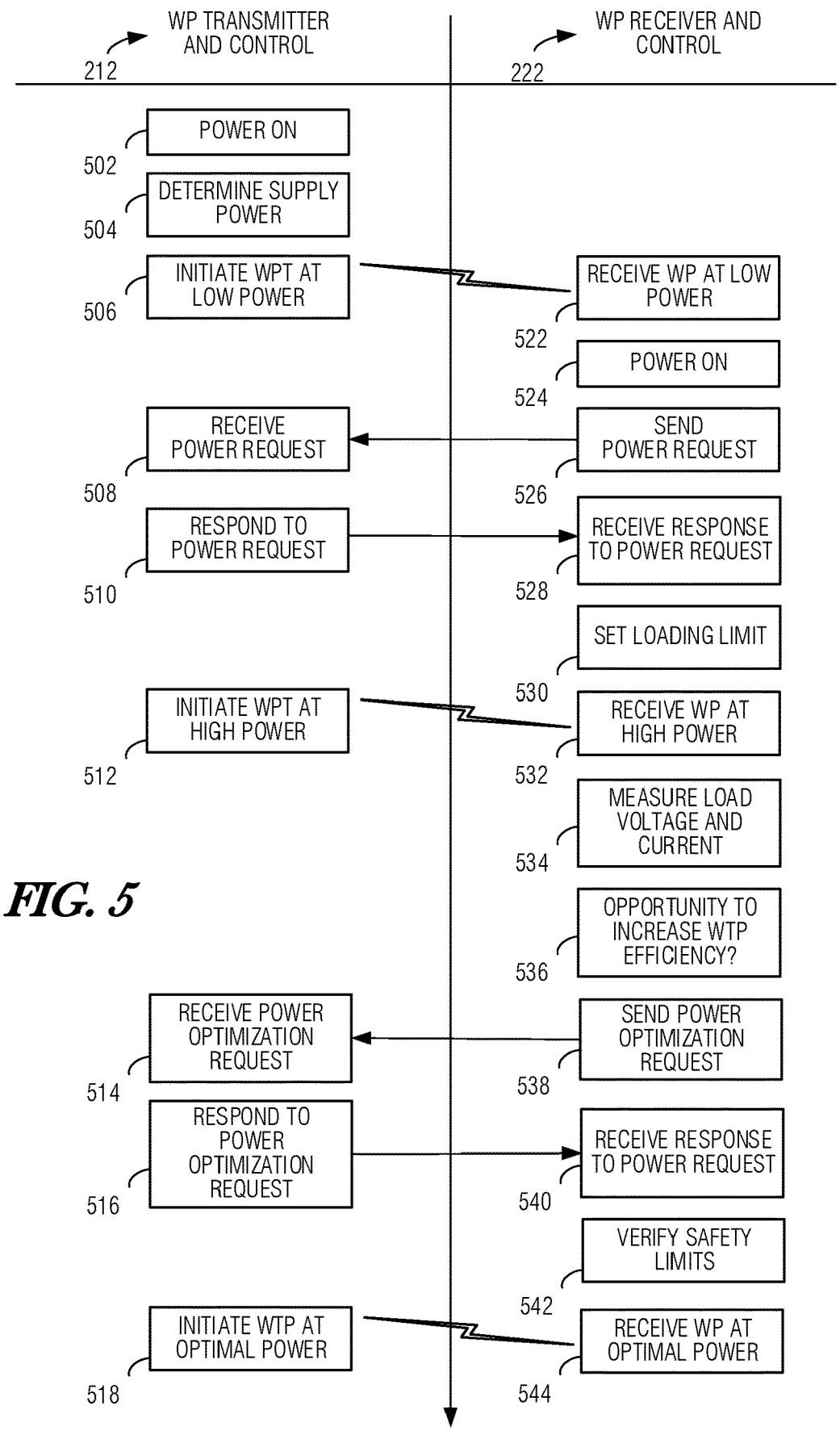
FIG. 5 is a sequence diagram illustrating startup, power adjustment, and optimization operations of a WPT system according to various embodiments.

FIG. 5 is a sequence diagram illustrating startup, power adjustment, and optimization operations according to various embodiments. Notably, FIG. 5 illustrates a full-featured example with a number of operations, which may or may not all be present in a given implementation. In addition, the illustrated operations are presented in an exemplary order, which may or may not be followed in the exact sequence according to various implementations. Thus, it should be understood that various other embodiments may have fewer operations, operations in a different order, or both variations from the embodiment depicted in FIG. 5.

The sequence diagram shows operations carried out by WP transmitter and control circuit 212 in the left-hand column, and operations carried out by WP receiver and control circuit 222 in the right-hand column. Certain operations are interactive between WP transmitter and control circuit 212 and WP receiver and control circuit 222, as shown.

Operations 502-512 and 522-532 exemplify initial startup and power mode selection by WP transmitter and control circuit 212 and WP receiver and control circuit 222, respectively. At 502, WP transmitter and control circuit 212 is powered on. At 504, WP transmitter and control circuit 212 determines the available supply power. This operation may be involve conducting communications with a USB host device in accordance with USB connectivity protocol, for instance, where WP transmitter and control circuit 212 may negotiate a maximum available power level from its power source. In non-USB embodiments, WP transmitter and control circuit 212 may measure the input voltage and conduct a message exchange with the power source to determine if the power source is a compatible power source.

At 506, regardless of the type of power supply, WP transmitter and control circuit 212 powers up the WPT TX path circuitry in the low-power mode, and initiates WPT when a HID 220 is placed in WPT proximity and when the WPT proximity placement of HID 220 is detected. Accordingly, at 522 WP receiver and control circuit 222 receives wireless power transmitted in the low-power mode. At 524, if the WP receiver and control circuit 222 is not already powered from the HID's battery, it powers up using its low-power mode to receive the WPT initiated by WP transmitter and control circuit 212 at 506.

At 526, WP receiver and control circuit 222 sends a power-request message. In one type of embodiment, the power-request message is sent using signaling over the WPT channel. For instance, the power-request message may be a part of a standard Qi startup protocol for power recipient devices. In another embodiment, the power-request message may be sent over another link, such as over a personal-area network (PAN) such as Bluetooth Low Energy, for instance, as standardized under IEEE 802.15.4, under a WiFi standard such as IEEE 802.11, near-field communications (NFC) as standardized under ECMA-340 or ISO/IEC 18092, or other suitable communication channel. The power-request message may include an indicator corresponding to the maximum power level that HID 220 can accept via WPT.

At 508, WP transmitter and control circuit 212 receives the power-request message, and responds at 510. The response may likewise be transmitted over the WPT channel or over any other suitable channel such as those listed above, and the response may include a message indicating a power level that the base station is able to provide to HID 220. The available power-level indicator may state or represent the voltage and maximum current that is available over the WPT channel. The WP receiver and control circuit 222 receives the response message at 528. Based on the limits of the available power, WP receiver and control circuit 222 sets a limit for the WP receiver on the amount of current that it may draw so that the available power is not exceeded.

At 512, WP transmitter and control circuit 212 initiates WPT at the available high power in accordance with the determination made at operation 504 and the negotiation at operations 508-510. The WP receiver and control circuit 222 receives this higher power at 532 via the WPT.

Operations 534-544 by WP receiver and control circuit 222 and operations 514-518 by WP transmitter and control circuit 212 correspond to a dynamic WPT optimization technique that may be performed interactively between WP transmitter and control circuit 212 and WP receiver and control circuit 222 according to an example implementation. In one such embodiment, WP transmitter and control circuit 212 and WP receiver and control circuit 222 negotiate a new operating point for the WPT. This new operating point may depend on the power needs of HID 220, the currently available power level from WP transmitter and control circuit 212, and on optimization criteria that is stored by WP transmitter and control circuit 212. Accordingly, at 534, WP receiver and control circuit 222 reads measurements of the load voltage and current. Based on these measurements, at 536, WP receiver and control circuit 222 determines if there is an opportunity to increase the WPT efficiency. In general, the opportunity to increase the WPT efficiency for a given level of power transfer is based on the ability of the base station to source higher current at a lower voltage.

In one approach, WP receiver and control circuit 222 determines whether an optimization opportunity exists by comparing the measured voltage at the load with a reference voltage. As an example, the reference voltage is a voltage value corresponding to the negotiated power level, for instance, as received by WP receiver and control circuit 222 at 528. In another example, the reference voltage is a measured voltage in the RX path 406A, 406B (FIG. 4) that is being used to receive the WPT power. Such a measured voltage in the RX path 406A, 406B may be at the coil antenna terminals, at an output of a rectifier, or at an input of a power-conditioning circuit.

The comparing of the measured voltage at the load with the reference voltage may involve addition or subtraction of a voltage offset value to or from one of the compared quantities. The comparing may instead or also involve the use of a scaling factor applied to one of the compared quantities. In general, the aim of the comparison is to determine if the measured load voltage is less than the reference voltage by some significant amount, which is indicative of inefficiencies, such as the operation of a voltage regulator in the RX path, to significantly drop the voltage of the WPT-received power in order to provide the appropriate amount of current to the load.

Thus, for example, efficiency may be gained by reducing the WPT-received voltage to be at a level that matches or slightly exceeds the voltage corresponding to the required current draw at the load. A further mechanism by which efficiency may be gained is by transmitting a set power level via WPT at a lower voltage and higher current, with the higher current tending to improve the magnetic or electromagnetic coupling of the coil antennas.

Upon determining that optimizations are available, WP transmitter and control circuit 212 sends a power optimization request to WP receiver and control circuit 222 at 538, which, in turn, is received at 514. The power optimization request may utilize the same or similar messaging as the power request at 526 described above, or it may utilize different messaging. For example, in one embodiment, WP receiver and control circuit 222 specifies a particular voltage to be transmitted as part of the optimization request at 538. In another embodiment, WP receiver and control circuit 222 specifies increment voltage amounts by which to increase or reduce the transmitted voltage of the WPT as part of the optimization request at 538. At 516, WP transmitter and control circuit 212 responds to the optimization request by sending a message confirming the requested transmission voltage setting, rejecting it, or proposing an alternative power transmission setting at 516, which WP receiver and control circuit 222 receives at 540. At 542, WP receiver and control circuit 222 verifies that the confirmed or modified WPT settings are within predefined safety limits. If necessary, a new power optimization request at 538 may be generated by WP receiver and control circuit 222 in response to a determined failure to meet safety limits.

At 518, WP transmitter and control circuit 212 initiates WTP at the optimal power settings, which in this example are the power settings agreed to in the optimization negotiation protocol carried out in operations 514-516 of WP transmitter and control circuit 212 and operations 538-540 of WP receiver and control circuit 222. At 544, assuming the safety limits are not violated, WP receiver and control circuit 222 receives the WPT at the optimized settings.

Operations 534-544 and 514-518 of the sequence may be performed iteratively by WP receiver and control circuit 222 and WP transmitter and control circuit 212, respectively, as the loading conditions of HID 220 may vary over time, causing the optimal WPT operating point to shift.

Figure 6:
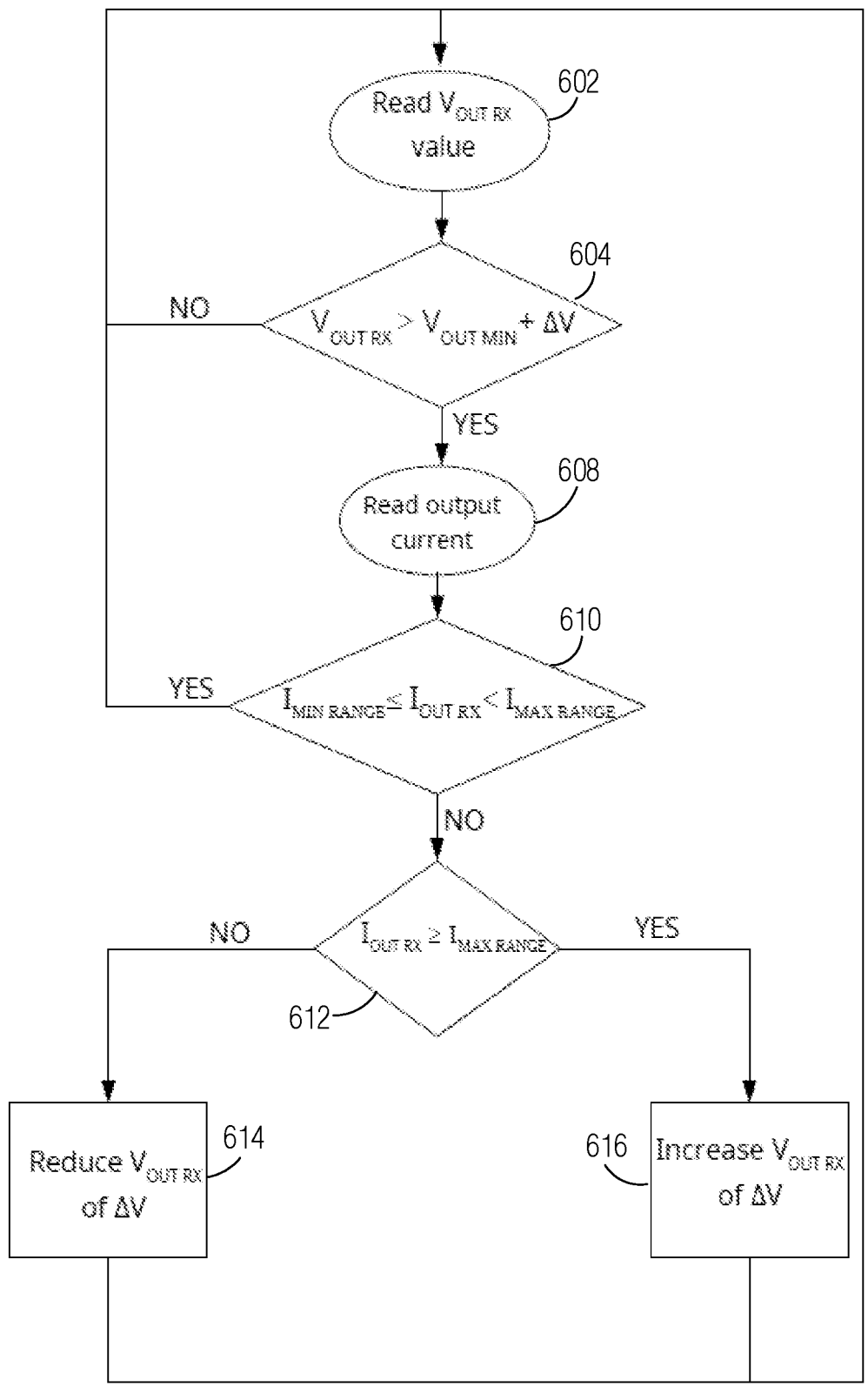
FIG. 6 is a flow diagram of another WPT-optimization process that may be carried out by WP receiver and control circuit according to a related embodiment.

FIG. 6 is a flow diagram of another WPT-optimization process that may be carried out by WP receiver and control circuit 222 according to a related embodiment. The process of FIG. 6 aims to dynamically determine an operating point for WP receiver and control circuit 222 in which the voltage at the load is minimized while the current at the output of WP receiver and control circuit 222 is maximized within practical constraints. This process utilizes monitoring of both, current and voltage, at the output of WP receiver and control circuit 222. A control system is arranged to vary the voltage at the output of WP receiver and control circuit 222 while monitoring the output current to the load.

At 602, the voltage at the output of WP receiver and control circuit 222, $V_{OUT\ RX}$, is read. At decision 604, WP receiver and control circuit 222 determines if $V_{OUT\ RX}$ is greater than the current minimum voltage required to operate HID 220 (e.g., whether in battery-charging-only mode or in active operation), plus a reliability margin, $\Delta V$. The reliability margin $\Delta V$ is an empirically-determined and predefined quantity. In the affirmative case as a result of decision 604, the process advances to 608, where the output current $I_{OUT\ RX}$, that is, the current being drawn by the load, is read.

Decision 610, determines if the output current $I_{OUT\ RX}$ falls in an acceptable range within which the current $I_{OUT\ RX}$ can vary without calling for any change in operating point. If the result of decision 610 is negative (i.e., the current is outside of the acceptable range), the output current $I_{OUT\ RX}$ is compared against a predefined maximum allowed current value $I_{MAX}$ at 612, which may be set, for instance, by WP transmitter and control circuit 212 based on its available power source. In the negative case, the process branches to 614, which reduces $V_{OUT\ RX}$ in RX path 406A, 406B (FIG. 4) in order to cause an increase in $I_{OUT\ RX}$ due to the drawing of more current by a power regulator, for instance. Otherwise, if $I_{OUT\ RX}$ is greater than or equal to $I_{MAX}$, the process branches to 616 to increase $V_{OUT\ RX}$ in RX path 406A, 406B and cause a reduction in $I_{OUT\ RX}$. The process then iterates to account for any changing operating conditions.

Figure 7:
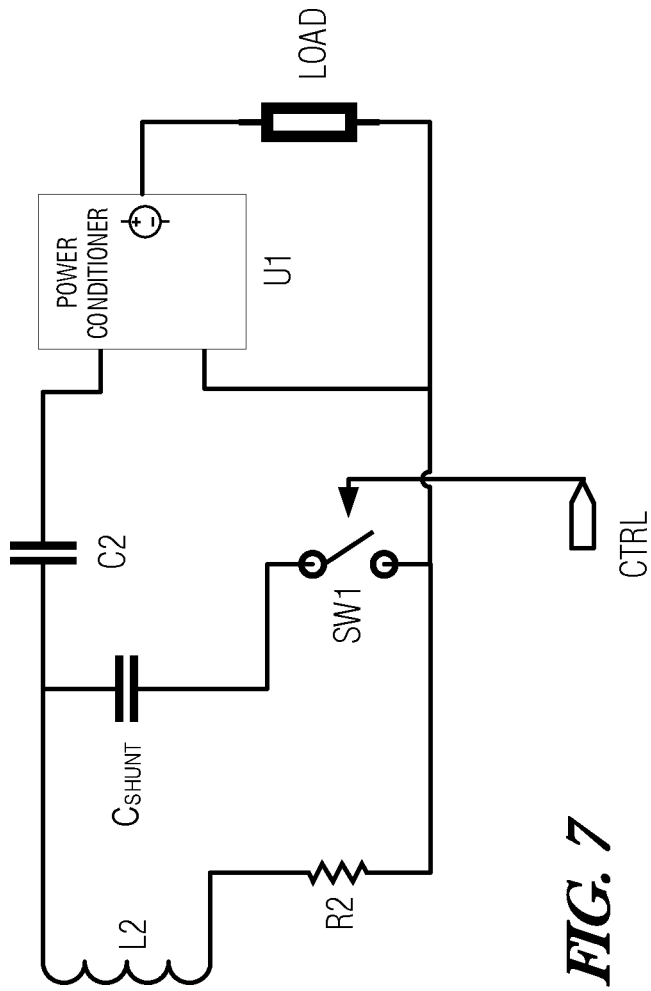
FIG. 7 is a simplified circuit diagram illustrating an example WPT system in which the WP transmitter and receiver's magnetic (or, in some embodiments, electromagnetic) coupling is dynamically adjustable to optimize performance for the selected WPT mode.
Figure 7:
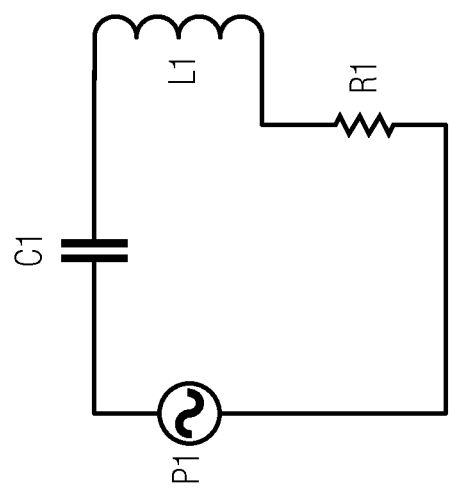

FIG. 7 is a simplified circuit diagram illustrating an example WPT system in which the WP transmitter and receiver's magnetic or, in some embodiments, electromagnetic coupling is dynamically adjustable to optimize performance for the selected WPT mode (e.g., low-power mode and high-power mode). As depicted, simplified WP transmitter includes an AC power source P1, which may have an operating power-transfer frequency in the tens to hundreds of kHz. On the transmitter side, a first series RLC circuit is provided including coil antenna L1, series capacitor C1, and resistor R1 representing the small parasitic resistance of the components and interconnects.

On the receiver side, a second series RLC circuit is provided including coil antenna L2, series capacitor C2, and R2 representing a small parasitic resistance of the components and interconnects. Power conditioner U1, which converts the received AC signal into a DC power signal, supplies power to the load, which may be a battery charging circuit. Notably, a shunt capacitor $C_{SHUNT}$ is switchably added or removed from the circuit by switch SW1, which is controlled by control input CTRL.

Figure 8:
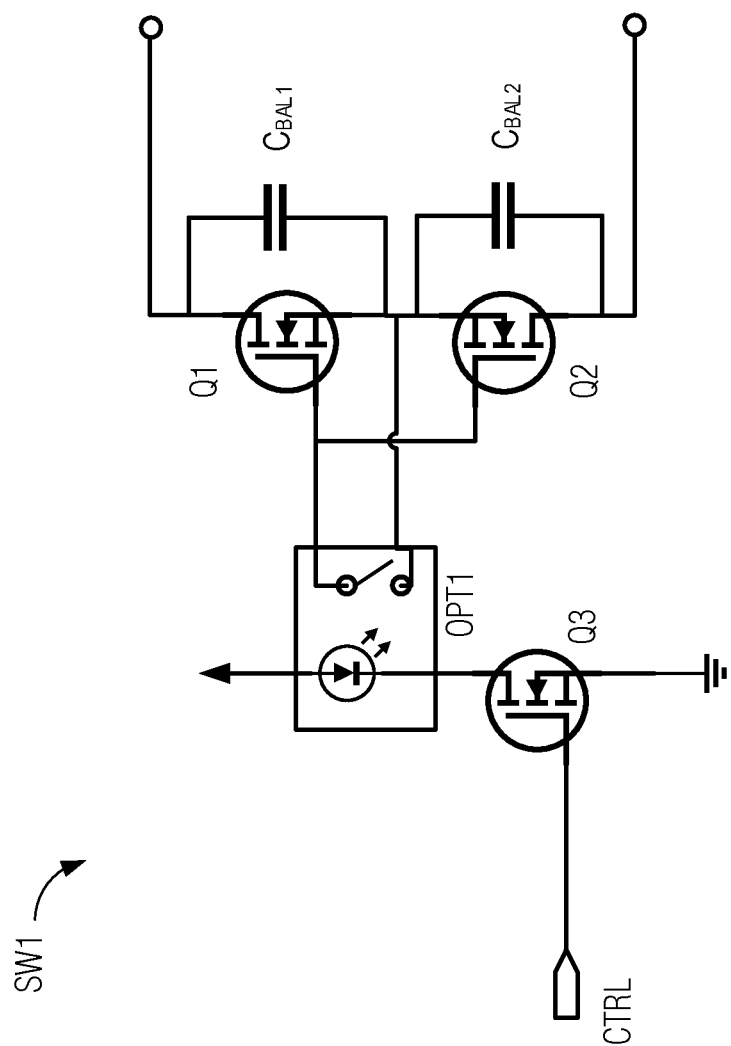
FIG. 8 is a simplified schematic diagram illustrating an electronic switch for inserting a shunt capacitance in the RX side of the WPT system depicted in FIG. 7 according to an embodiment.

Switch SW1 may be implemented as a controllable insertion circuit as depicted in FIG. 8. Control input CTRL switches drive transistor Q3, which activates optoisolator OPT1. In turn, optoisolator OPT1 activates switching transistors Q1 and Q2, which form a shunt across the output terminals. Switching transistors Q1 and Q2 are preferably low-on-resistance devices, such as trench MOSFET transistors. Balancing capacitors $C_{BAL1}$ and $C_{BAL2}$ are small-value capacitors that balance the voltage across each open channel of Q1 and Q2 when these switching transistors are deactivated.

Referring again to FIG. 7, in operation, the shunt capacitor $C_{SHUNT}$ is inserted into the circuit only when the selected WPT mode is the low-power mode. The shunt capacitance reduces the no-load losses of the WPT system by introduction of a reactance to create a resonance characteristic. The resonance characteristic is present regardless of the amount of loading, even at small or zero loads. As a result, the introduced resonance characteristic increases the TX to RX gain of the system as a whole, with a lower magnetization current on the TX side, hence improving overall WPT efficiency for low-power operations.

In a related embodiment, the shunt capacitance is switched out of the circuit in the high-power mode of operation. In a high-loading mode of operation, the addition of the shunt capacitance is negligible and tends to undesirably affect the AC response of the system.

Referring again to FIG. 4, the switching in and out of the shunt capacitance is an example of mode selection the RX path from among path 406A (which includes the shunt capacitance), and path 406B (excluding the shunt capacitance) with much of the rest of the circuitry on the RX side constituting overlapping RX path components 407.

Figure 9:
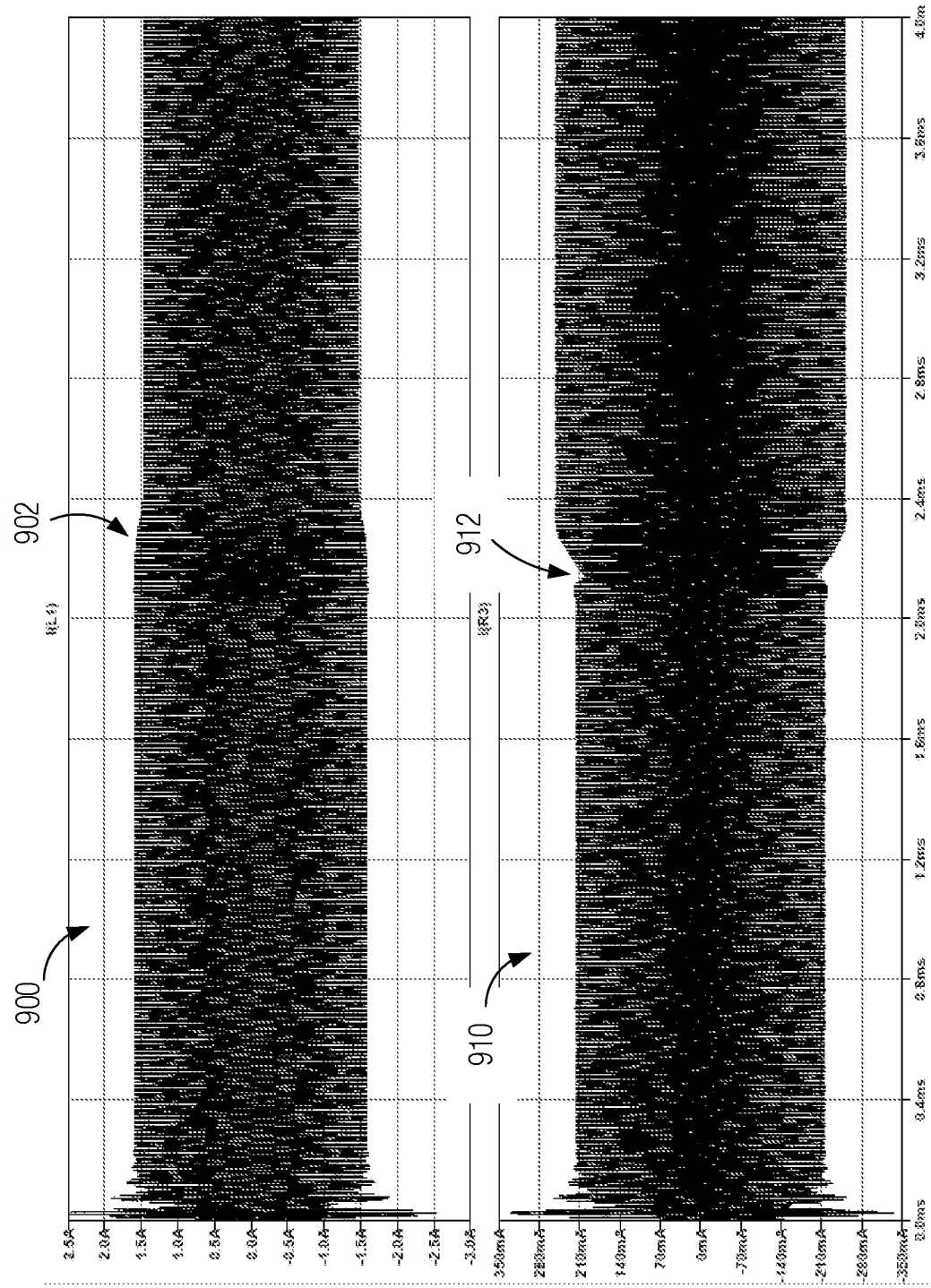
FIG. 9 is a diagram showing two plots that illustrate the effect of the addition of a shunt capacitance into the RX side of the WPT circuit of FIG. 7 according to an example.

FIG. 9 shows two plots illustrating the effect of the addition of the shunt capacitance into the RX side of the WPT circuit of FIG. 7. Trace 900 shows the current in the TX coil antenna L1, and trace 910 shows the current at the input to power conditioner U1. The traces initially represent the respective currents without the shunt capacitance in the circuit. At the introduction of the shunt capacitance, as indicated at 902 and 912, the current in the TX coil antenna is reduced in amplitude, while the current at the input to U1 increases in amplitude. Notably, this change occurs with no change in the input voltage on the TX side. Hence, the change represents an increase in WPT efficiency.

Additional Notes and Examples

Example 1 is apparatus for a wireless power transfer (WPT) transmitter, the apparatus comprising: a power input arranged to receive electrical power from a power source; first transmitter (TX) path circuitry arranged to be coupled to the power input and to a first set of at least one transmission coil; second TX path circuitry arranged to be coupled to the power input and to a second set of at least one transmission coil; transmitter mode selector circuitry arranged to selectively couple one of the first TX path circuitry and the second TX path circuitry between the power input and the first or the second set of at least one transmission coil in response to a path selection signal; and controller circuitry communicatively coupled to the power input and to the transmitter mode selector circuitry, the controller circuitry operative to determine a power level of the power source from among a first power level and a second power level, and to generate the path selection signal based on the determined power level of the power source; wherein the first TX path circuitry is operative to provide WPT transmission at a greater efficiency to a WPT receiver when the power source is at the first power level than when the power source is at the second power level; and wherein the second TX path circuitry is operative to provide WPT transmission at a greater efficiency to a WPT receiver when the power source is at the second power level than when the power source is at the first power level.

In Example 2, the subject matter of Example 1 includes, wherein the first power level is about 5 W or less, and wherein the second power level is greater than about 5 W.

In Example 3, the subject matter of Example 2 includes, wherein the power input is a universal serial bus (USB) power input operative to accept power via a USB connection at the first power level and at the second power level.

In Example 4, the subject matter of Examples 1-3 includes, wherein the first TX path circuitry and the second TX path circuitry include at least one shared portion of circuitry.

In Example 5, the subject matter of Examples 1-4 includes, wherein the first set of at least one transmission coil and the second set of at least one transmission coil include a common transmission coil.

In Example 6, the subject matter of Examples 1-4 includes, wherein the first set of at least one transmission coil and the second set of at least one transmission coil include a plurality of different transmission coils.

In Example 7, the subject matter of Examples 1-6 includes, wherein the second TX path circuitry includes a voltage level converter circuit, and wherein the second TX path circuitry does not include a voltage level converter circuit.

In Example 8, the subject matter of Examples 1-7 includes, wherein the first TX path circuitry includes a first power carrier signal generator circuit operative to generate a power carrier signal at a first frequency, and wherein the second TX path circuitry includes a second power carrier signal generator circuit operative to generate a power carrier signal at a second frequency that is different from the first frequency.

In Example 9, the subject matter of Examples 1-8 includes, wherein the controller circuitry is operative to: determine that the power level of the power source is the second power level which is greater than the first power level; detect a presence of the WPT receiver within WPT proximity; in response to detection of the presence of the WPT receiver within the WPT proximity, cause the first transmitter path circuitry to initiate WPT transmission in a low-power mode to the WPT receiver; receive a power request from the WPT receiver that requests a change in power to be wirelessly transmitted to the WPT receiver; and in response to the power request, cause a change the WPT power level to be wirelessly transmitted to the WPT receiver, including changing the path selection signal.

In Example 10, the subject matter of Example 9 includes, wherein the controller circuitry is further operative to: in response to initiation of WPT transmission in the low-power mode to the WPT receiver, transmit information identifying the determined power level of the power source to the WPT receiver.

In Example 11, the subject matter of Examples 9-10 includes, wherein the controller circuitry is further operative to: in response to the change of the WPT power level, receive a power optimization request from the WPT receiver that requests a second change in WPT power to be wirelessly transmitted to the WPT receiver, wherein the second change is a reduction of WPT carrier voltage; and in response to the power optimization request, cause the second change in WPT power.

Example 12 is apparatus for a wireless power transfer (WPT) receiver, the apparatus comprising: a power output arranged to provide WPT-received electrical power to a load; first receiver (RX) path circuitry arranged to be coupled to the power output and to a first set of at least one reception coil; second RX path circuitry arranged to be coupled to the power output and to a second set of at least one reception coil; receiver mode selector circuitry arranged to selectively couple one of the first RX path circuitry and the second RX path circuitry between the power output and the first or the second set of at least one reception coil in response to a path selection signal; and controller circuitry communicatively coupled to the receiver mode selector circuitry, and operative to generate the path selection signal based on a power requirement of the load; wherein one of the first RX path circuitry and the second RX path circuitry is operative to selectively receive WPT transmission from a WPT transmitter based on the path selection signal; wherein the first RX path circuitry is operative to receive the WPT transmission at a greater efficiency when the received WPT is at a first power level than when the received WPT is at a second power level; and wherein the second RX path circuitry is operative to receive the WPT transmission at a greater efficiency when the received WPT is at the second power level than when the received WPT is at the first power level.

In Example 13, the subject matter of Example 12 includes, wherein the first power level is about 5 W or less, and wherein the second power level is greater than about 5 W.

In Example 14, the subject matter of Examples 12-13 includes, wherein the first TX path circuitry and the second TX path circuitry include at least one shared portion of circuitry.

In Example 15, the subject matter of Examples 12-14 includes, wherein the first RX path circuitry includes a shunt capacitance across the first set of at least one reception coil that provides a resonance characteristic, and wherein the second RX path circuitry omits the shunt capacitance from the second set of at least one reception coil.

In Example 16, the subject matter of Examples 12-15 includes, wherein the first set of at least one reception coil and the second set of at least one reception coil include a common reception coil.

In Example 17, the subject matter of Examples 12-16 includes, wherein the controller circuitry is arranged to read a measurement of voltage at the load and of current being drawn by the load.

In Example 18, the subject matter of Example 17 includes, wherein the controller circuitry is operative to further generate the path selection signal based on the measurement of voltage and current.

In Example 19, the subject matter of Examples 17-18 includes, wherein the controller circuitry is arranged to be communicatively coupled to a WPT transmitter, and to generate a power optimization request to the WPT transmitter that requests a change in power to be wirelessly transmitted by the WPT transmitter, the power request being based on the measurement of voltage at the load and of current being drawn by the load.

In Example 20, the subject matter of Example 19 includes, wherein the power optimization request requests the change in power which is to reduce a voltage of the WPT to be wirelessly transmitted while substantially maintaining the same power level as was received via the WPT prior to the power optimization request such that greater current is transmitted via the WPT.

In Example 21, the subject matter of Examples 19-20 includes, wherein the controller circuitry is arranged to determine whether the voltage measurement at the load is less than a reference voltage level by a predefined margin, and wherein the power optimization request is based on the determination of whether the voltage measurement at the load is less than the reference voltage level by a predefined margin.

In Example 22, the subject matter of Examples 19-21 includes, wherein the power optimization request is further based on a determination of whether the current draw is within a defined range.

In Example 23, the subject matter of Examples 12-22 includes, wherein the controller circuitry arranged to be communicatively coupled to a WPT transmitter, to receive information indicating available power from the WPT transmitter, and to generate the path selection signal based further on the available power from the WPT transmitter.

Example 24 is apparatus for a wireless power transfer (WPT) receiver, the apparatus comprising: a power output arranged to provide WPT-received electrical power to a load; receiver (RX) path circuitry coupled to the power output and to a set of at least one reception coil, and to receive WPT via the set of at least one reception coil; controller circuitry arranged to read measurements of voltage at the load and of current being drawn by the load, and to dynamically adjust a characteristic of the WPT in response to the measurements.

In Example 25, the subject matter of Example 24 includes, wherein the controller circuitry is arranged to be communicatively coupled to a WPT transmitter, and to generate a power optimization request to the WPT transmitter that requests a change in power to be wirelessly transmitted by the WPT transmitter, the power request being based on the measurement of voltage at the load and of current being drawn by the load.

In Example 26, the subject matter of Example 25 includes, wherein the power optimization request requests the change in power which is to reduce a voltage of the WPT to be wirelessly transmitted while substantially maintaining the same power level as was received via the WPT prior to the power optimization request such that greater current is transmitted via the WPT.

In Example 27, the subject matter of Examples 25-26 includes, wherein the controller circuitry is arranged to determine whether the voltage measurement at the load is less than a reference voltage level by a predefined margin, and wherein the power optimization request is based on the determination of whether the voltage measurement at the load is less than the reference voltage level by a predefined margin.

In Example 28, the subject matter of Examples 25-27 includes, wherein the power optimization request is further based on a determination of whether the current draw is within a defined range.

Example 30 is an apparatus comprising means to implement of any of Examples 1-28.

Example 31 is a system to implement of any of Examples 1-28.

Example 32 is a method to implement of any of Examples 1-28.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. Apparatus for a wireless power transfer (WPT) receiver, the apparatus comprising:
   a power output arranged to provide WPT-received electrical power to a load;
   receiver (RX) path circuitry coupled to the power output and to a set of at least one reception coil, and operative to receive WPT via the set of at least one reception coil, from at least one WPT transmission coil of a WPT transmitter, the RX path circuitry including low-power RX path circuitry including power conditioning circuitry arranged to condition the WPT-received electrical power for delivery to the load, and high-power RX path circuitry arranged to condition the WPT-received electrical power for delivery to the load, the high-power RX circuitry including power conditioning circuitry suitable for higher-power levels than the low-power RX path circuitry, wherein the low-power RX path circuitry has components which differ from components of the high-power RX path circuitry, including a shunting reactance component that, together with a reception coil of the set of at least one reception coil, provides a resonance characteristic which is operative to enable resonant power transfer from the at least one WPT transmission coil of the WPT transmitter to the set of the at least one reception coil, wherein current of the resonant power transfer counteracts magnetization current of the at least one WPT transmission coil thereby causing the low-power RX path circuitry to be operative at a greater efficiency than the high-power RX path circuitry at any power level for which the low-power RX path circuitry is suitable, wherein the high-power RX path circuitry lacks a shunting reactance component such that the high-power RX path circuitry does not have the resonant power transfer;
   communication circuitry electrically coupled to the set of at least one reception coil and operative to send and receive wireless communications via the set of at least one reception coil, the communication circuitry being distinct from the load; and
   controller circuitry operatively coupled to the communication circuitry and to the RX path circuitry, the controller circuitry operative to negotiate with a WPT power source a power level of the WPT power source from among a low power level and a high power level, and to select RX path circuitry from among the low-power RX path circuitry and the high-power RX path circuitry, based on the negotiated power level of the WPT power source, with which to receive WPT power from the WPT power source.

2. The apparatus of claim 1, wherein the controller circuitry is arranged to read measurements of voltage at the load and of current being drawn by the load, and to dynamically determine an opportunity for WPT optimization based on the measurements, wherein the controller circuitry is operative to make a comparison of a measured voltage at the load with a reference voltage, wherein the reference voltage is a measured voltage at a location within the receiver path circuitry, and wherein the controller circuitry is further arranged to be communicatively coupled to a WPT power source via the communication circuitry, and in response to a positive determination of the opportunity for WPT optimization, to generate a power optimization request to the WPT power source that requests a change in a power delivery characteristic to be wirelessly transmitted by the WPT power source.

3. The apparatus of claim 2, wherein the power optimization request requests the change in the power delivery characteristic which is to reduce a voltage of the WPT to be wirelessly transmitted to cause an increase of a current of the WPT while substantially maintaining the same power level as was received via the WPT prior to the power optimization request such that greater current is transmitted via the WPT.

4. The apparatus of claim 2, wherein the comparison includes determining whether the voltage measurement at the load is less than the reference voltage level by a predefined margin, and wherein the power optimization request is based on the determination of whether the voltage measurement at the load is less than the reference voltage level by a predefined margin.

5. The apparatus of claim 2, wherein the power optimization request is further based on a determination of whether the current draw is within a defined range.

6. The apparatus of claim 2, wherein the reference voltage is a voltage at coil antenna terminals, a voltage at an output of a rectifier, or a voltage at an input of a power-conditioning circuit within the RX path circuitry.

7. The apparatus of claim 2, wherein comparing includes an addition or subtraction of a voltage offset value to or from one of the compared measured voltages.

8. The apparatus of claim 1, wherein the low-power RX path circuitry is suitable for a first power level of about 5 W or less, and wherein the high-power RX path circuitry is suitable for a second power level that is greater than about 5 W.

9. The apparatus of claim 1, wherein the low-power RX path circuitry and the high-power RX path circuitry include at least one shared portion of circuitry.

10. The apparatus of claim 1, wherein the set of at least one reception coil includes a first reception coil that is part of the low-power RX path circuitry and a second reception coil that is part of the high-power RX path circuitry.

11. The apparatus of claim 1, wherein the controller circuitry is arranged to be communicatively coupled to a WPT power source, to receive information indicating available power from the WPT power source, and to dynamically adjust a characteristic of the WPT based further on the available power from the WPT power source.

12. The apparatus of claim 1, wherein the controller circuitry is selected from the group consisting of a microcontroller, an embedded microcontroller, an instruction processor, and a digital logic circuit.

13. The apparatus of claim 1, wherein the controller circuitry is configured to set a limit for the RX path circuitry for an amount of current drawn in response to receiving a message from the WPT power source indicating a power level that is available to be provided via WPT.

14. The apparatus of claim 13, wherein the controller circuitry is configured to negotiate with the WPT power source for a new operating point for the WPT.

15. The apparatus of claim 1, wherein the controller circuitry is configured to transmit a specified voltage to be transmitted by the WPT power source responsive to the measurements.

16. The apparatus of claim 15, wherein the specified voltage includes a specified increment to increase or reduce the transmitted voltage.

17. The apparatus of claim 15, wherein the controller circuitry is configured to:
receive a message from the WPT power source indicating an alternate proposed voltage; and
verify whether the alternate proposed voltage is within predefined safety limits, and to confirm or reject the alternate proposed voltage and/or to propose another proposed voltage to the WPT power source.

18. The apparatus of claim 1, further comprising:
receiver mode selector circuitry operatively coupled to the controller circuitry and arranged to selectively couple one of the low-power RX path circuitry and the high-power RX path circuitry between the power output and the set of at least one reception coil in response to a path selection signal.

19. The apparatus of claim 18, wherein the path selection signal is generated by the controller circuitry based on a power requirement of the load.

* * * * *